United States Patent [19]

Chuang

[11] Patent Number: 4,874,938
[45] Date of Patent: Oct. 17, 1989

[54] AUTOMATIC MOTOR VEHICLE VISOR SYSTEM

[75] Inventor: Cliff Chuang, Lowell, Mass.
[73] Assignee: Prospects Corp., Lowell, Mass.
[21] Appl. No.: 168,674
[22] Filed: Mar. 16, 1988
[51] Int. Cl.[4] .................................................. G01J 1/20
[52] U.S. Cl. .................................. 250/203 R; 356/152
[58] Field of Search ........................ 250/203 R, 203 S; 126/425; 356/141, 152

[56] References Cited

U.S. PATENT DOCUMENTS

| | | | |
|---|---|---|---|
| 4,325,788 | 4/1982 | Snyder | 126/425 |
| 4,622,470 | 11/1986 | Makino et al. | 126/425 |
| 4,687,923 | 8/1987 | Bauck | 126/425 |
| 4,760,772 | 8/1988 | Horiguchi et al. | 250/203 R |

Primary Examiner—Edward P. Westin
Assistant Examiner—Khaled Shami
Attorney, Agent, or Firm—Robert T. Dunn

[57] ABSTRACT

An automatic electrically operated visor or sun blocker system for a vehicle includes a sun blocker, such as a visor (81), that is automatically positioned laterally across the vehicle windshield (1) to selected azimuth ($\psi$) directions, depending upon the relative azimuth direction of the sun and is automatically extended downward to selected elevation ($\theta$) directions, depending upon the relative elevation direction of the sun, as required to block the sun so that it does not strike the vehicle driver's eyes. Thus, the visor (81) or sun blocker is automatically positioned depending upon the azimuth ($\psi$) and elevation ($\theta$) angles of the sun direction relative to the driver's eyes. Those angles are detected by photoresponsive elements (61) that produce signals indicative of the azimuth and elevation angles of the sun, that initiate positioning the sun blocker (81) laterally and extending it downward to block the sun so that it does not strike the driver's eyes. In a particular embodiment, a visor (81) on a track (71) above the windshield (1) is driven laterally to predetermined positions depending upon the direction of the sun and is automatically extended (downward), as required, to block the sun so that it does not strike the driver's eyes.

20 Claims, 6 Drawing Sheets

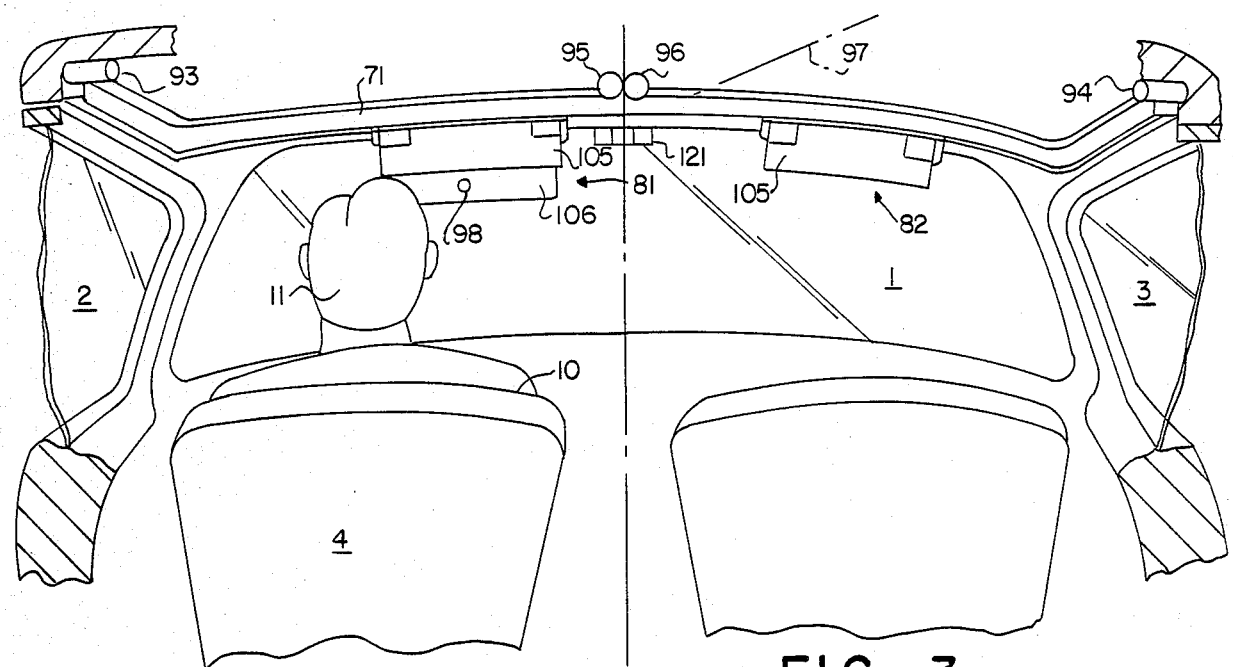
FIG. 3
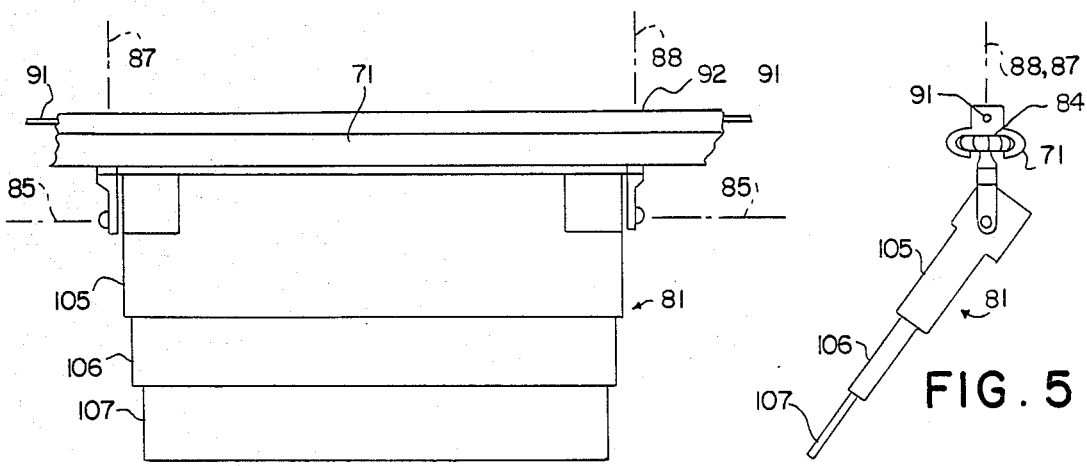
FIG. 4
FIG. 5
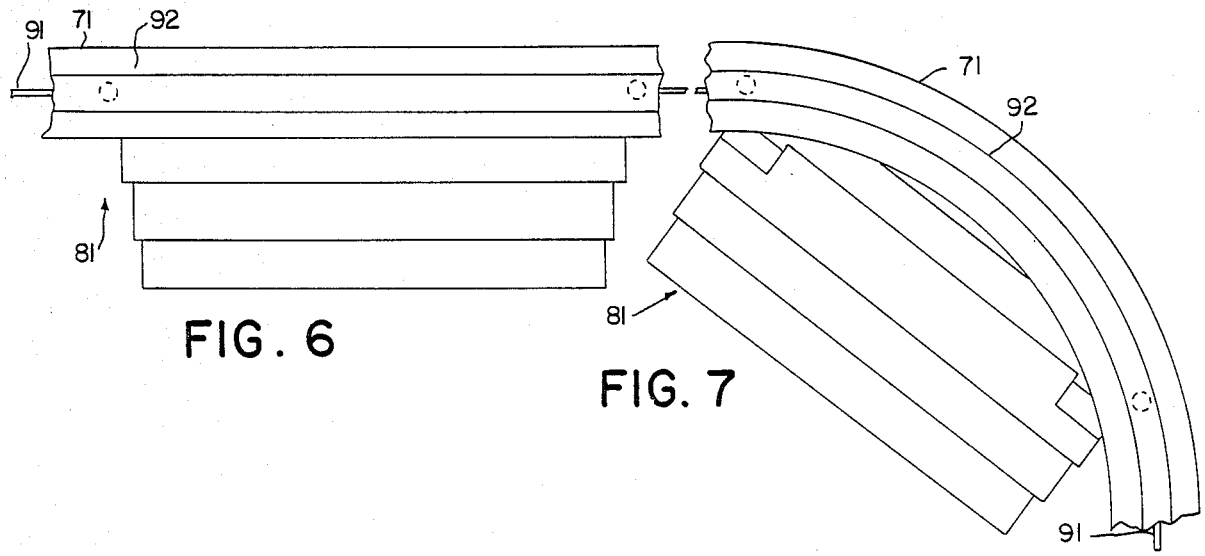
FIG. 6
FIG. 7

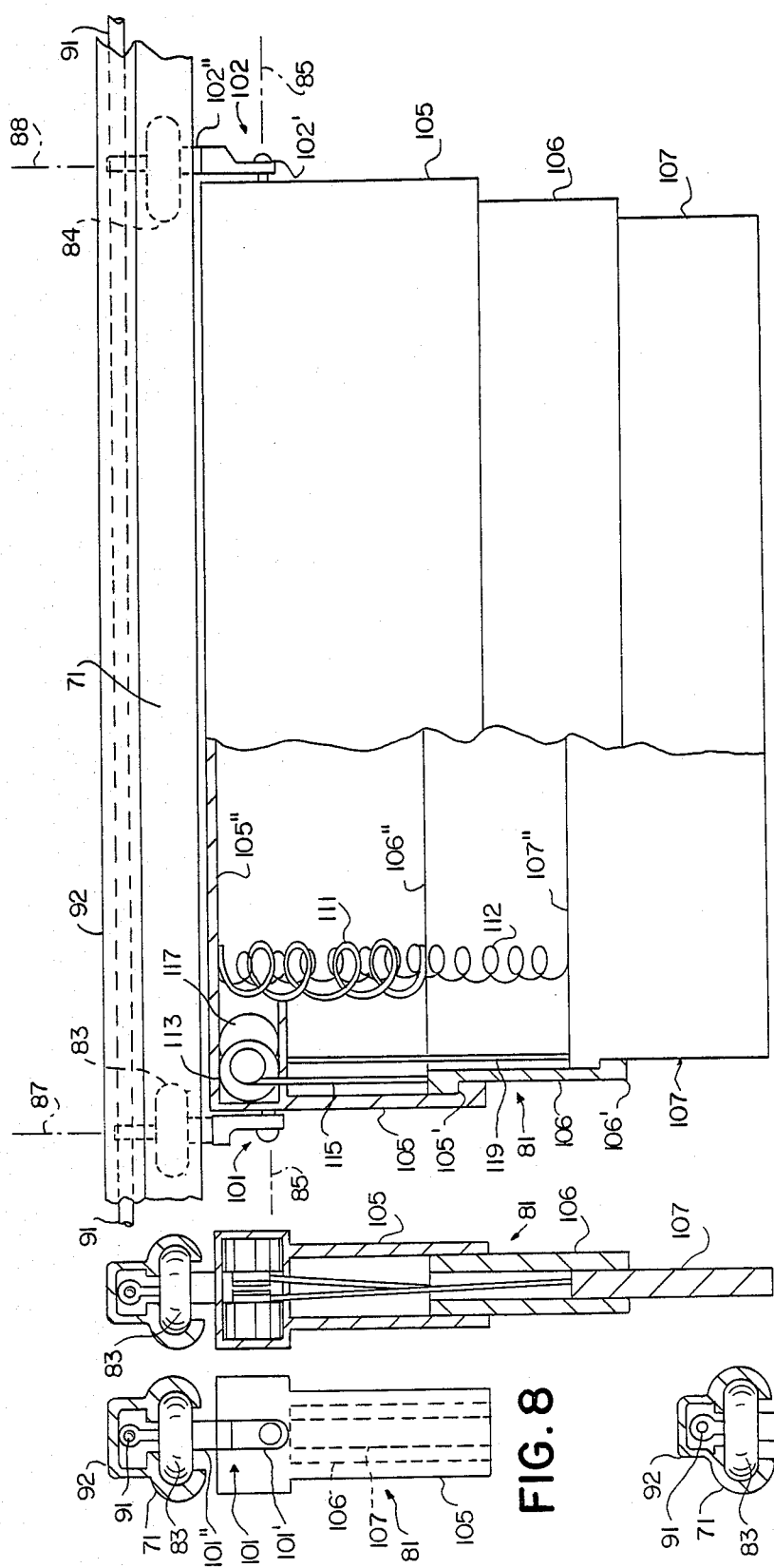

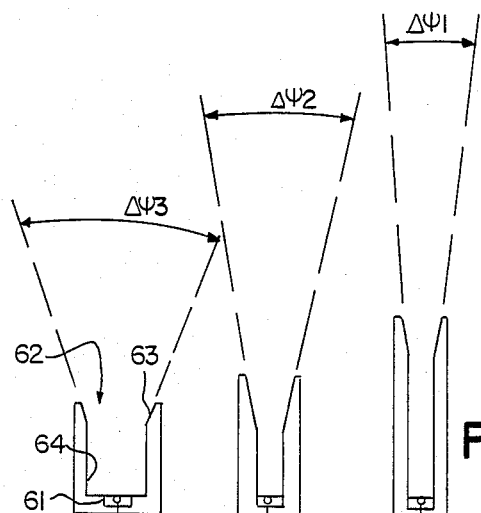
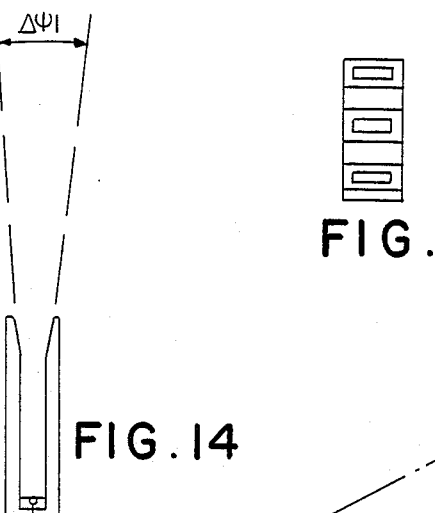
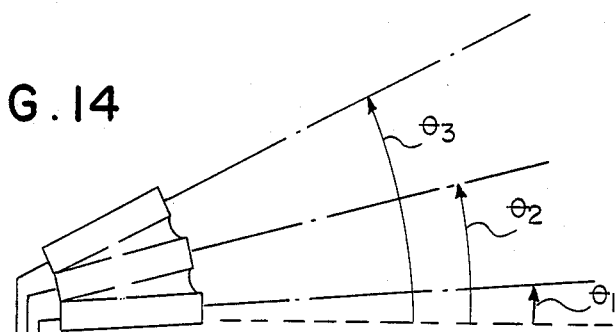
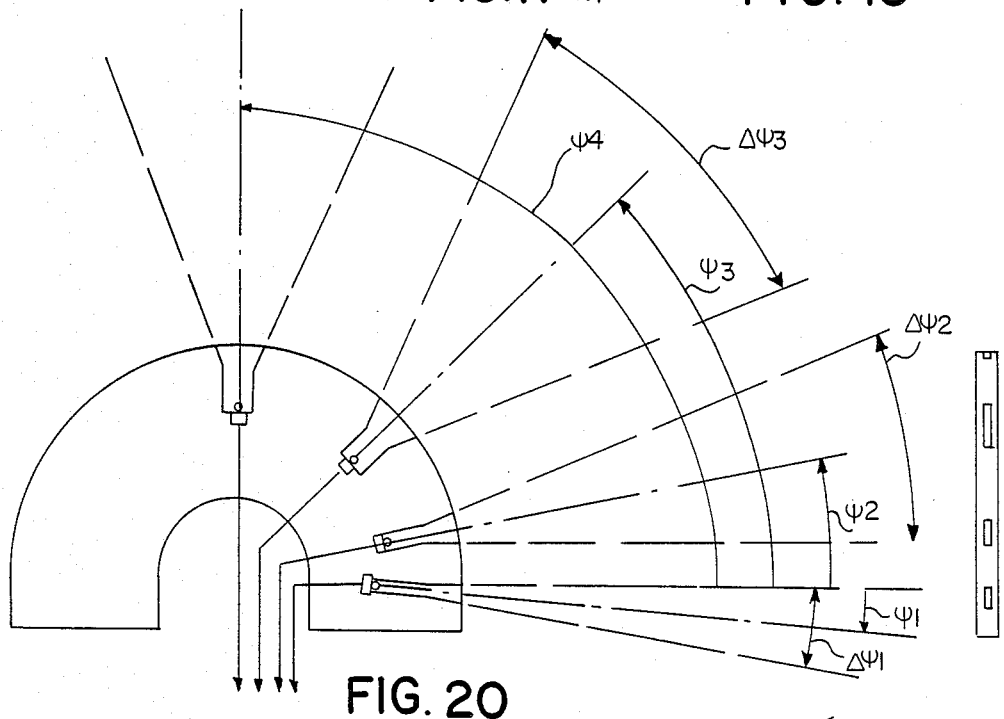
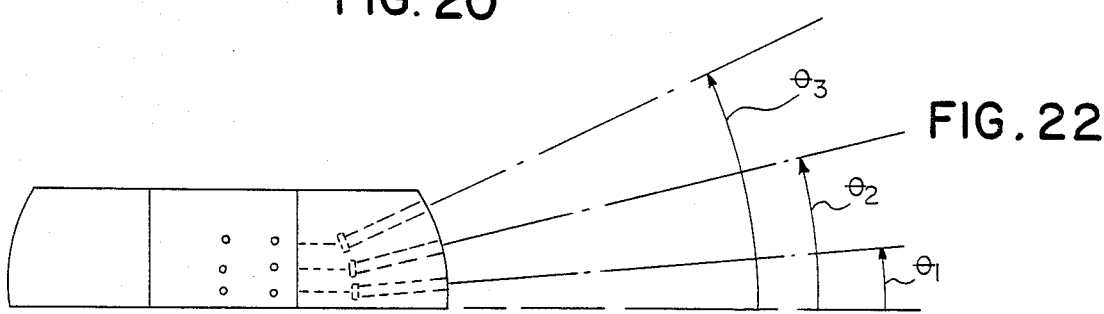

AUTOMATIC MOTOR VEHICLE VISOR SYSTEM

BACKGROUND OF THE INVENTION

This inventiion relates to sun-glare actuation systems and more particularly to a system including sun direction detectors and an electrically operable sun visor system for use on motor vehicles such as buses, trucks, and automobiles.

Heretofore, electrically operable visor systems have been suggested for use on automobiles to automatically extend a stationary, but extendible, sun visor, depending upon signals from light detectors that are located in alignment with the vehicle driver's eyes. In effect, the light detectors intercept the same ray of sunlight that strikes the driver's eyes and generates a signal to a motor that extends the stationary visor to block the sun ray from both the detector and the driver's eyes. Such system are null type feedback systems inasmuch as the sun visor is extended until a signal is no longer produced by the sun light detector and require that the sun light detector be aligned with the driver's eyes. This often and often interferes with the driver's view of the road ahead. Hence, some of the limitations of such electrically operable visor systems are that the detector blocks the driver's view and unless the sun is from a direction subtended by the stationary position of the sun visor from the driver's eyes, the visor does not block the sun from his eyes.

Other sun visor apparatus that has been proposed provides a track for a laterally moveable sun visor along the top of the windshield so that the driver can move the visor manually along the track to a desirable lateral position and then tilt the visor up or down to block the sun. Such a system avoids the limitations of the automatic system described above inasmuch as there is nothing blocking the operator's view and the visor can be moved laterally as necessary to block the sun when the sun is to the left or right of the driver and not just straight ahead. However, such manually operated visors requires the driver to interrupt driving and move the visor along the lateral track and then tilt it as necessary to block the sun. When driving along a road that turns frequently, the driver must make frequent manual adjustments in the lateral position in the visor and the tilt of the visor to keep the sun from his eyes.

It is an object of the present invention to provide an automatic motor vehicle visor system that avoid some of the limitations of the prior visor systems.

It is another object of the present invention to provide a visor system that automatically positions the visor to the appropriate lateral position depending on the relative azimuth direction of the sun and automatically extends the visor depending upon the relative elevation direction of the sun, even while those relative directions of the sun to the vehicle change.

It is a further object to provide such an automatic visor system that automatically blocks the sun even while the relative azimuth direction of the sun to the eyes of the driver of the vehicle changes.

It is another object to provide an automatic motor vehicle sun blocking system including a sun blocker that can be automatically positioned at a number of different lateral positions across the motor vehicle windshield, depending upon the direction of the sun relative to the driver's eyes.

It is another object to provide such an automatic sun blocking system further including means for automatically extending the sun blocker downward as necessary to block the sun at different elevation angles.

Other features and objects and advantages of the present invention will be apparent from the description herein of embodiments of the invention taken in conjunction with the drawings.

SUMMARY OF THE INVENTION

Embodiments of the invention provide an automatic electrically operated visor or sun blocker system for an automobile that includes a sun blocker that is automatically positioned laterally to selected azimuth ($\psi$) directions along the top of the vehicle windshield, depending upon the relative azimuth direction of the sun and is automatically extended downward to selected elevation ($\theta$) directions, depending upon the relative elevation direction of the sun, as required to block the sun so that it does not strike the driver's eyes. Thus, the visor or sun blocker is automatically positioned depending upon the azimuth and elevation angles of the sun direction relative to the driver's eyes. Those angles are detected by photo-responsive elements so positioned and shielded that signals from said elements are indicative of the azimuth and elevation angles of the sun and initiate positioning the sun blocker laterally and extending it downward to block the sun so that it does not strike the driver's eyes.

A preferred embodiment of the present invention includes a sun light direction sensor including a plurality of photo-responsive electric elements each exposed through a separate optical path to a given predetermined solid angle subtended from the detector, the solid angle having an azimuth angular dimension ($\Delta\psi$) and an elevation angular dimension ($\Delta\theta$) such that the detector initiates a signal only when the sun falls within said solid angle and so the energization of a detector is representative of the azimuth angle ($\psi$) and the elevation angle ($\theta$) from the driver's eyes to the sun. The separate signals from the multitude of detectors are fed to an operation control module that includes a microprocessor unit and is programmed to produce digital signals in response thereto that indicate the required lateral (azimuth) position of the sun visor and the required extended (elevation) position of the sun visor necessary to block the sun from the driver's eyes. Those digital signals are fed to a motor drive unit that produces energization signals to motors that position the sun visor laterally and extend the sun visor as dictated by the digital signals to block the sun from the driver's eyes.

DESCRIPTION OF THE DRAWINGS

FIG. 3 is a rear view of the same area of the automobile shown with parts of the vehicle broken away to reveal the track along the top of the windshield and along the top of the side windows at the driver's position with the sun visor positioned by the system and extended by the system to block rays of sun from the driver's right that would strike the driver's eyes;

FIGS. 4, 5 and 6 are enlarged front, side and top views of the sun visor at the position also shown in FIG. 3;

FIG. 7 is a top view of the sun visor positioned laterally at the turn of the track going from the top of the windshield to the top a side window;

FIGS. 8 to 11 are enlarged views of the sun visor showing the track, the pivoting track follower to which the visor pivotally attaches and some of the inner parts of the visor including the telescoping sections, whereby the visor is extended, and the motors that move the telescoping sections against spring loads of which, FIG. 8 is a side view of the visor retracted, FIG. 9 is a side cross section view of the visor extended, FIG. 10 is a front partially broken away view of the visor extended showing the inner parts and FIG. 11 is a side view of the visor retracted and tilted;

FIGS. 12, 13 and 14 show sun light detecting optical devices having solid angle azimuth dimensions ($\Delta\psi$) of 45°, 22½° and 11°, respectively;

FIGS. 15, 16 and 17 are end views of the devices in FIGS. 12, 13 and 14, respectively;

FIG. 18 shows an array of devices each having the same solid angle azimuth dimension ($\Delta\psi$), arranged at three different elevation angles so that the array detects sun light from three different elevation ranges at one azimuth range;

FIG. 19 is an end view of the array of FIG. 18;

FIG. 20 shows an array of such detectors each subtending a different slid angle azimuth angular dimension ($\Delta\psi$) and located with respect to each other to cover a total range of azimuth directions ($\psi$) of over 90°, in four ranges centered at +90°, +45°, +22½° and −5°;

FIG. 21 is a edge view of the device in FIG. 20 showing the apertures of the light paths;

FIG. 22 illustrates an arrangement of several arrays such as in FIG. 20 each at a different elevation angle to provide, in effect, detection of sun azimuth and elevation directions over azimuth directions from zero to +180° and over elevation directions from zero to +30°;

DESCRIPTION OF EMBODIMENTS OF THE INVENTION

Conventional automobile sun visors or sun blockers are manually operated devices at fixed positions located just above the windshield of a motor vehicle. Usually a visor is provided for the driver and another for the front seat passenger and they are manipulated to block the sun from the driver's and/or the passenger's eyes by tilting them down against the inside of the windshield. The conventional visor cannot be moved laterally and its dimensions are fixed; the only adjustment being that the visor can be tilted up and down and so the visors can only block sun from a limited solid angle subtended from the driver's/passenger's eyes and when the sun does not fall within that solid angle, the driver/passenger must suffer the sun in his eyes.

Prior efforts to increae the range of positions of a sun visor have not met with any notable success. For example, as mentioned above, a conventional visor has been mounted on a lateral track above the windshield, enabling the operator to manually position the visor anywhere along the track to thereby increase the solid angle of sun directions in the azimuth dimension that can be intercepted by the visor. Another visor system mentioned above provides a stationary visor that is extendible so that, in effect, the vertical dimension of the visor can be increased to block the sun within the same azimuth dimension but over an increased elevation dimension.

Other visor systems suggest the fixed, but extendible visor operate automatically in response to a sun light detector located in front of the operator's eyes so that when the visor is extended it blocks sun light to the detector as well as the driver's eyes. Clearly, these prior systems are all limited in operation and have not met with any noticeable success and they are not currently provided in automobiles.

An object of the present invention is to provide a sun visor system in which the visor is automatically positioned over a wide range of azimuth directins and is adjustable in size to cover a range of elevation directions, all in response to sun light direction detectors that are located out of the way and do not block the driver's or the passenger's view of the road and environment, ahead and to the sides.

Sun Direction and Elevation

Figure 1:
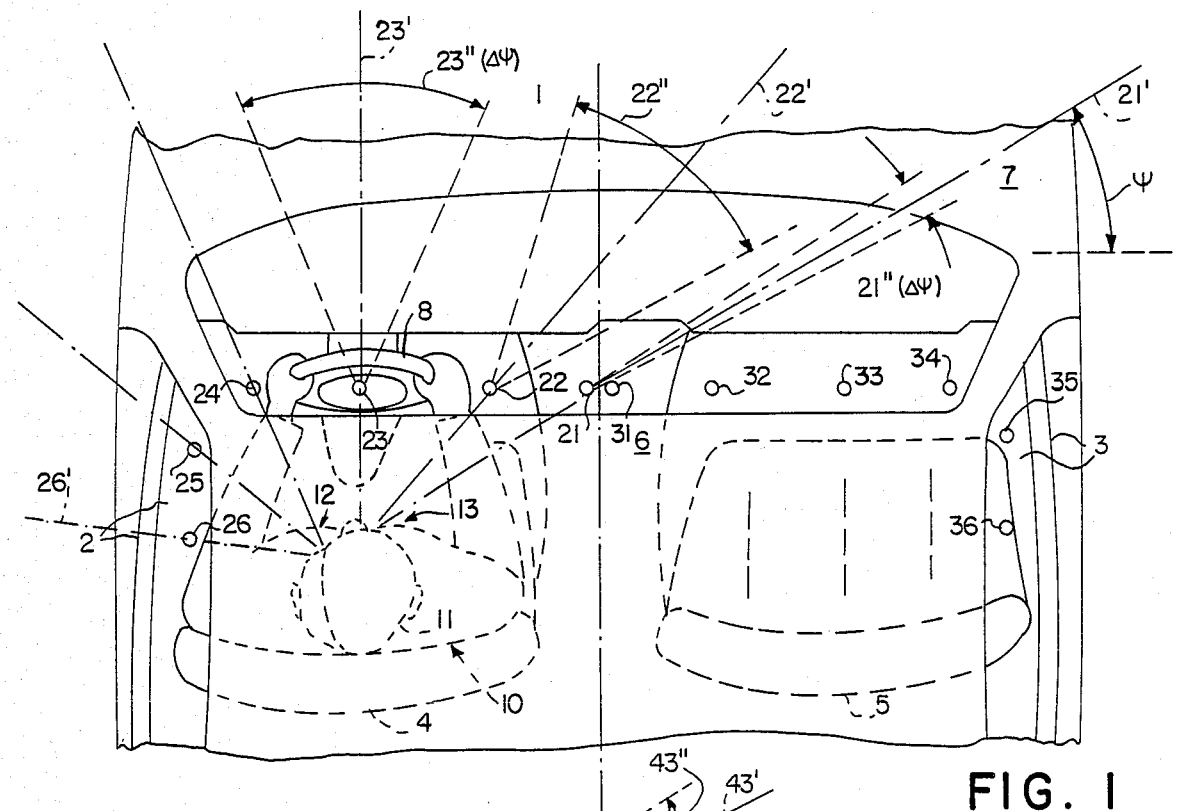
FIG. 1 is a top plan view of the front seat and windshield area of an automobile showing the front windshield and side windows, the seat and position of the operator and the locations of sun detector devices in accordance with an embodiment of the invention.
Figure 2:
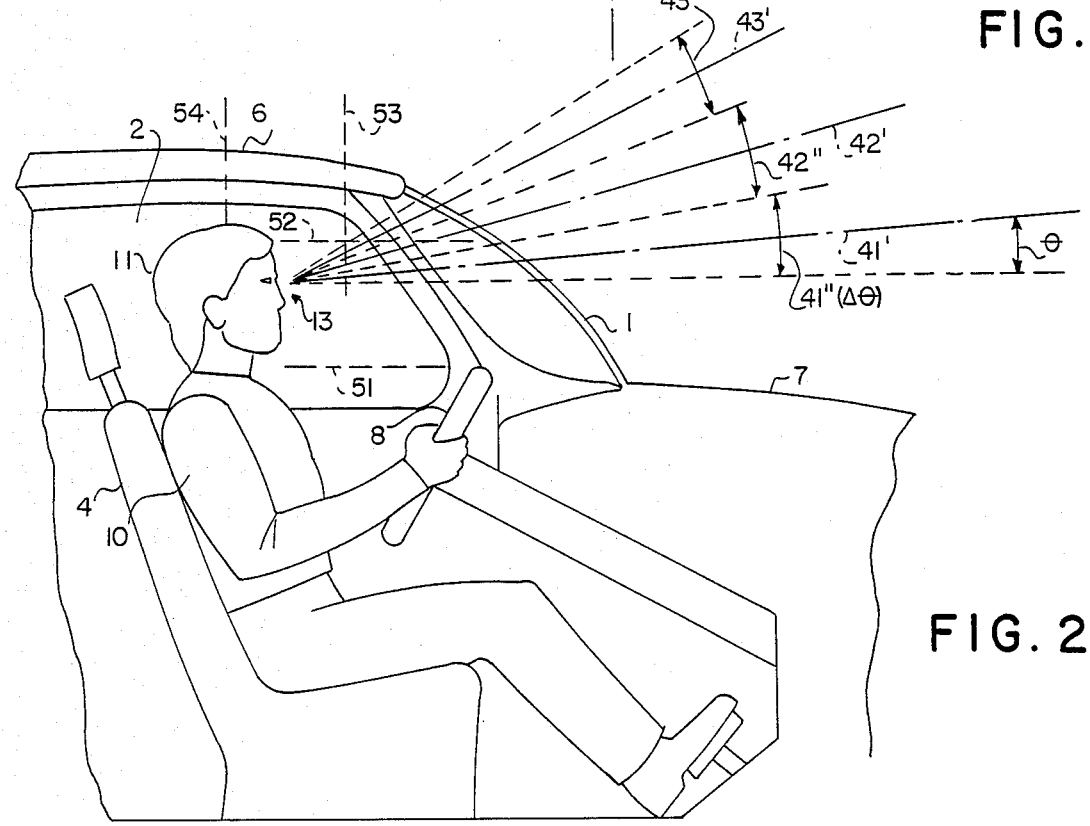
FIG. 2 is a side view of the same part of the automobile shown with the right side of the ehicle broken away and indicating the position of the driver and the elevation angles of a likely sun rays that would disturb the driver.

Turning first to FIGS. 1 to 3, which are top, side and rear views of the front seats of a conventional automobile with the driver in position to operate the vehicle. FIG. 1 is a top view showing particularly the windshield 1, the left and right side windows 2 and 3 and the driver 10 sitting in the driver's seat 4. The front passenger seat 5, the car roof 6 and the hood 7 and steering wheel 8 are also shown.

A plurality of sun light detection positions are shown in FIG. 1 along the top of the windshield and along the top of the two side windows. On the driver's side these detection positions are denoted 21 to 26 of which 21 to 24 are along the top of the windshield and 25 and 26 are along the top of the left side window. Similarly, on the passenger's side are sun light detector positions 31 to 36.

Subtended from the driver's left and right eyes (denoted 12 and 13) are a number of sun light directions that pass through the sun light detector positions and define a number of azimuth ($\psi$) directions of the sun relative to the driver's eyes. Some of these lines define the solid angle azimuth dimensions ($\Delta\psi$) of separate detectors required to cover all azimuth directions of the sun relative to the driver's eyes from the driver's extreme left to the driver's extreme right. For example, the direction line 23' through center position 23 covers the azimuth angle dimension of the solid angle subtended therefrom indicated by arc 23" and similar center lines and arcs are defined for each of the other detector positions 21, 22, 24, 25 and 26. Clearly, the solid angle azimuth dimension ($\Delta\psi$) covered by the sensor directly in front of the driver is the greatest and diminishes for the sensors further removed to his right and so also for the sensors further removed to his left. Thus, the azimuth dimension ($\Delta\psi$) of the solid angle subtended by each detector, in this arrangement may be determined by the location of the detector along the top of the windshield or the side windows.

The other dimension of each solid angle subtended by a sun light detector is the elevation angle dimension ($\Delta\theta$). The range of those dimensions for the driver 10 seated as shown are illustrated in FIG. 2. The elevation angles ($\theta$) of the solid angle subtended from the driver's eyes are denoted 41", 42" and 43", of which the center lines are denoted 41', 42' and 43'. These are the same solid angle elevation dimensions that are subtended at the sun light detector positions 21 to 26 shown in FIG. 1. As mmentioned above, the solid angle subtended at a detector position is the same as the solid angle subtended at the driver's eyes.

Sun Detector Placement

Having defined the solid angles, each in terms of its azimuth angle dimension ($\Delta\psi$) and its elevation angle dimension ($\Delta\theta$) and the azimuth direction ($\psi$) and elevation direction ($\theta$) of the sensor, the inventor herein has observed that a number of sun light detectors could be employed each with a predetermined azimuth direction and dimension and elevation direction and dimension to cover all possible sun directions relative to the driver's eyes for a given vehicle and a given driver in that vehicle; and, further and most important, such sensors could be located anywhere on the vehicle so long as the direction of view of the sensor wasn't blocked somehow by parts of the vehicle. Furthermore, all sensors could be located at the same place and that place could be removed from the driver's and the passenger's views through the windshield and side windows and could even be on top of the vehicle and completely out of sight of the driver and passenger.

Other Inputs of the System

It is also observed by the inventor herein that any system for automatically positioning a visor to protect the driver's eyes from the sun could require in addition to signals from a plurality of such detectors, the following inputs:
1. Information about the size and positioning of the windshield and side windows:
2. Information about the position of the driver and the position of the passenger (the person's eyes) relative to the windshield and side windows.

The information about the size and position of the windshield and side windows is a characteristic of the vehicle and once determined would need no further adjustment. The information about the position of the driver's and passenger's eyes would, of course, vary from time to time for a given person and would vary from person to person.

FIG. 2 shows, as an example, the range of vertical and horizontal positions of the eyes of different drivers, or that might be taken by a given driver who changes his position or changes the position of the driver's seat from one time of operation to another. In this example, the height ranges from the extreme low denoted by line 51 to the extreme high denoted by line 52 and the range of horizontal positions (fore and aft positions) are denoted by the extreme forward position 53 and the extreme rearward position 54.

The invention herein has proposed and describes a computer that responds to: signals from sunlight direction sensors such as described herein, fixed information representative of the vehicle and variable positions of the driver's and passenger's eyes to provide control signals that initiate and control energization of an automatic electrically driven sun visor system to position and adjust one or more sun visors so that they will block the sun from the driver's eyes and the passenger's eyes automatically and require no manipulation or action by the driver or passenger.

Sun Direction Detectors

FIGS. 12, 13 and 14 are optical schematic drawings of sun light direction detectors that have different solid angle azimuth angle dimensions ($\Delta\psi$), but the same solid angle elevation dimensions ($\Delta\theta$). In FIG. 12 the azimuth dimension is 45°, in FIG. 13 it is $22\frac{1}{2}$° and in FIG. 14 it is 11°. Each of these detectors includes a photo cell at the end of an optical path having an entrance aperture such that the azimuth dimension subtended by the photo-cell is defined by the aperture and the inside of the optical path is totally non-reflective so that only sun light within the azimuth dimension and the elevation dimension measured from the direction of the sensor strikes the photo cell. In FIG. 12, the photo cell is denoted 61, the optical path is 62, the aperture is 63 and the inside walls 64 of the optical path are totally non-reflective. The aperture ends of the detectors in FIGS. 12, 13 and 14 are shown in FIGS. 15, 16 and 17, respectively.

An array of detectors, such as the detector shown in FIGS. 14 and 17, each at the same azimuth direction, but at different elevation directions is shown in FIG. 18 and the aperture end of the array is shown in FIG. 19. Such an array could be located at each of the positions 21 to 26 shown in FIG. 1 to detect at each of those positions the sun from the azimuth direction covered by the sensors and provide along with that the elevation angle of the sun direction.

Another embodiment is illustrated by FIGS. 20 to 22. Here, as shown in FIGS. 20 and 21, in a relatively thin plate are embedded a number of different size detectors of the type shown in FIGS. 12 to 17 each in a different azimuth direction ($\psi$) and covering azimuth directions from the driver's right to the driver's left. The azimuth directions of the detectors in FIG. 20 as shown are, from right to left, $-5°$, $+22\frac{1}{2}°$, $+45°$, $+90°$, $+135°$, $+177°$ and $+185°$ and the azimuth dimension ($\Delta\psi$) of each detector is such that the sun from any direction from $-5°$ to $+185°$ is detected by at least one detector. As mentioned, all of these detectors shown in FIG. 20 have the same solid angle elevation angle dimension ($\Delta\theta$) and elevation direction ($\theta$), and so this array is a two dimensional array that covers an azimuth range of more than 180°.

In FIG. 22, there is shown a three dimensional array, which contains several arrays such as the array shown in FIGS. 20 and 21. In this three dimensional array, each azimuth has all elements thereof at the same elevation direction, and the solid angle azimuth angle dimension of each element is the same. Hence, the three dimensional array shown in FIG. 22 provides a multitude of signals, one from each photo detector, that indicate the azimuth and elevation direction of the sun with reference to the vehicle. This information, in combination with informations of the kinds described above, regarding the vehicle and the position of the driver's eyes enables a computer to determine the position of a visor (sun blocker) to block the sun from the driver's eyes.

Sun Visor Drive System for Azimuth and Elevation Positioning

Turning again to FIG. 3, there is shown a visor track 71 along the inside roof of the vehicle just above the windshield and extending laterlly across the whole windshield, then turning on the driver's side along the top of the left side and turning on the passenger's side along the top of the right side window. One or more driven sun visors 81 and 82 for the driver and passenger are carried along this track and are positioned automatically by the system described herein and the visor is automatically extended at each position to block the sun from the driver's and/or the pasenger's eyes.

The driver's visor 81 is shown enlarged in FIGS. 4 to 7 and even greater enlarged in FIGS. 8 to 11. In particular, FIGS. 3 to 7 show the track, visor and drives for positioning the visor at lateral positions across the windshield and at longitudinal positions along the side windows.

The visor 81 engages the track at follower wheels 83 and 84 at opposite sides of the visor. These follower wheels roll inside the track and captured by the track. Each rolls on an axle that extends from the wheel, through the track to the end of the visor and pivotally connects to the visor so that the visor can pivot with respect to the extending connector, about pivot line 85. In addition, the connector is rotatable about the axis of the follower wheel axle and so the connector for follower 83 is rotatable about line 87 and the connector for follower wheel 84 is rotatable about line 88. As a result, the visor can be moved laterally along the track and around the turn at each end from a lateral position along the windshield to a longitudinal position along a side window and, at any position, the visor can be tilted up against the inside of the roof (horizontally) or down to block the sun (vertically).

The visor is driven laterally and longitudinally along the track by a cable 91 contained in calbe housing 92 attached to the top of the track and co-extensive therewith. The cable is driven by left and right lateral drove motors 93 and 94, respectively. By this arrangement, the visor 81 can be positioned laterally at any position across the top of the windshield and along the driver's side window and along the passenger's side window.

Clearly, other arrangements for driving the visors laterally could be used. For example, visors 81 and 82 for the driver and the passenger could on the same track and driven by separate cables with separate drive motors. In that case, the drive motors for the driver's visor 81 would be motor 93 and a motor at the center denoted 85, and the passenger's visor 82 would be driven by motor 94 and another motor at the center denoted 96. A third arrangement could provide two parallel cables both running from motor 93 to motor 94, one moving the driver's visor and the other moving the passenger's visor; and so two motors would be provided at the position of motor 93, one for the driver's visor and the other for the passenger's visor and two motors at the position of motor 94, one for the driver's visor and the other for the passenger's visor. In any case, the visors would be constructed the same and carried in the same way on the track and driven in the same way by cable.

Visor Elevation Extension

FIGS. 4, 5 and 6 are front, side and top views of the visor extended to cover a low elevation angle of the sun and tilted downward part way toward vertical. In these figures the visor is shown fully extended. In FIG. 3, the visor is shown only partly extended as is necessary to intercept a sun ray along line 97 that would strike the driver's eyes were it not intercepted at point 98 by the extended part of the visor.

The visor extension drive is shown by FIGS. 8 to 11. These show several views of the visor enlarged to reveal details therein. The connector from the follower wheels 83 and 84 to the visor are denoted 101 and 102, respectively. As mentioned, the visor pivotally connects to the connector so that the visor can pivot about axis 85 with respect thereto. In addition, the connector rotatively connects with the associated follower wheel, and so can rotate with respect thereto about the follower axle axis. For this purpose the connector is in two parts; the first part 101' and 102' pivotally connects to the visor and the other part 101" and 102", all of 101 and 102, respectively, rotatable connects to the follower wheel axle.

FIG. 8 shows the visor in the retracted position and tilted vertical from the track. FIG. 10 is a front, partially broken away view of the visor and track with the visor extended and tilted downward vertically. FIG. 9 is a cross section view taken as shown in FIG. 10 of the extended visor and FIG. 11 shows the retracted visor tilted down at an angle. turning next to FIGS. 9 and 10, they show the three telescoping sections 105, 106 and 107 of the visor with the extensible sections 106 and 107 extended to their stops, the stop for 106 being at the end 105' of base section 105 and the stop for 107 being at the end 106' of section 106. Two or more springs for each of sections 106 and 107 are contained inside the visor. These springs act between the extensible section and the had of the base section and tend to urge the extensible section to its extended position as shown in FIGS. 9 and 10. For example, springs such as 111 act between head 105" and the top 106" and springs such as 112 act between head 105" and the top 107" of section 107 and these springs urge the associated section to its extended position as shown in these Figures.

In order to retract the extensible sections 106 and 107, drive motors on each side of the visor mounted in the head of base section 105 are provided. For example, drive motor 113 and a corresponding motor 114 at the opposite side of the visor wind up cables 115 and 116, respectively, pulling section 106 upward within base section 105 to the retracted position shown in FIG. 8 in opposition to springs 111, when these motors are energized. Similarly, motor 117 and a corrresponding motor 118 at the opposite side of the visor wind up cables 119 and 120, respectively, pulling section 107 within section 106 to the retracted position shown in FIG. 8. By this arrangement, the visor is normally extended and is retracted only by energizing the retracting motors.

The visor retracting motors 113, 114, 117 and 118 are preferable energized by an electric source that is controlled from the operation control module 130 powered by the vehicle battery. More particularly, these motors are driven by the motor drive unit of the operation control module, shown in FIG. 23, and so the power for the visor retraction motors must be fed to the visor at any of its lateral (azimuth) postions along the track. For that purpose, a motor power conductor must be provided for each section motor such as 113 and 117 to a stationary point within the vehicle. Such power conductors can be located within and be part of the drive cable 91. One such conductor can feed down from the drive cable through the axle of follower 83 to the visor and the other can feed down from the cable through the axle of follower 84 to the visor. One of these feeds would energize motors 113 and 114 that retract section 106 and the other would energize motors 117 and 118 that retract section 107. The details of construction of these power conductors to the motors and the cable and the feed through the connectors 101 and 102 are not disclosed in detail herein, as the construction of the same should be apparent to those skilled in the art.

Figure 23:
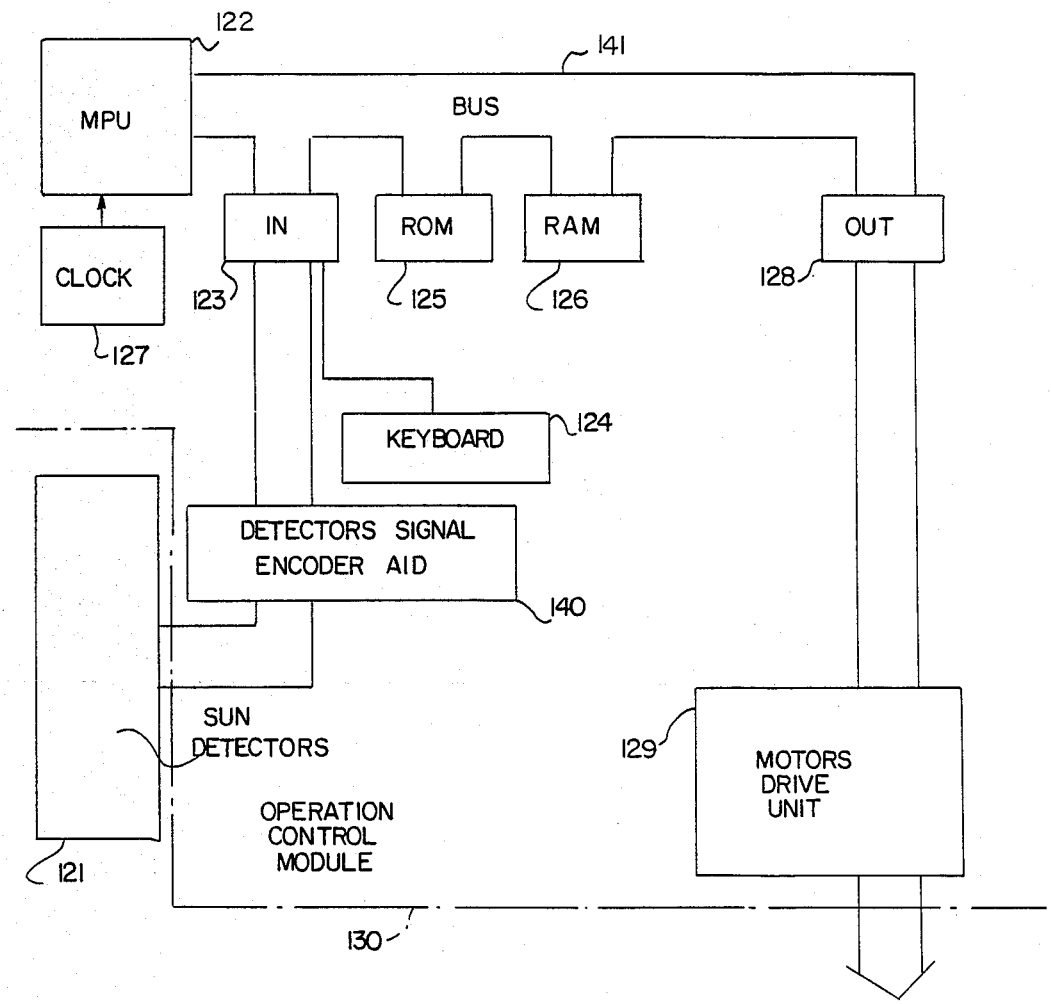
FIG. 23 is a block diagram showing the operation control module including A/D detector signal encoders, microprocessor chip, input and output chips, ROM and RAM chips, buses and the motor drive unit, responsive to the sun detectors, such as those shown in FIGS. 12 to 22, for automatically positioning the sun visor laterally and extending the sun visor as necessary to block the sun from the driver's eyes.
Figure 24:
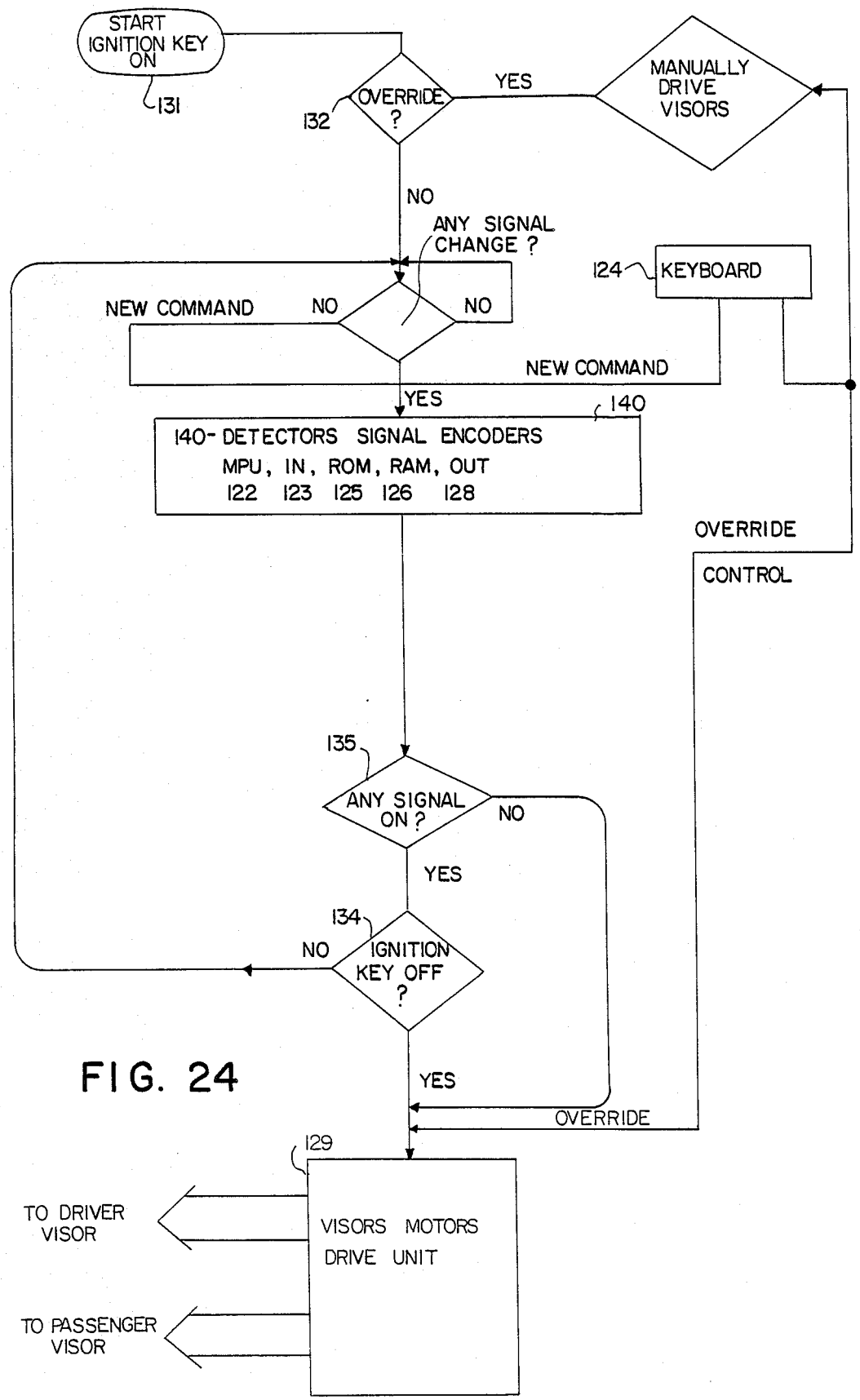
FIG. 24 is a functional diagram as an aid to understanding operation of the operation control module shown in FIG. 23.

Turning next to FIGS. 3, 23 and 24, there is shown a particular arrangement of sun detectors, visors, tracks and track motor drives and the operation control module and its functions for positioning a driver's visor and a passenger's visor according to the present invention to block the sun from the driver's eyes and the passenger's eyes. The arrangement here includes driver's visor 81 on the track 71 positioned by motors 83 and 95 and pssenger's visor 82 on the track positioned by motors 94 and 96.

At a convenient location preferably within the vehicle at the top center of the windshield is a three-dimensional array of sun direction detectors denoted 121. This array of detectors may be constructed substantially as described herein above with respect to FIGS. 20 to 22 and particularly FIG. 22. It is located inside the vehicle even though it could be located outside the vehicle, for example, on the roof, so that it is protected from the elements. It is located at the center top of the windshield so that it intercepts any sun rays that could fall upon the driver's or the passenger's eyes.

The array 121 produces a multitude of signals each indicative of the sun from a given azimuth ($\psi$) and a given elevation ($\theta$). As shown in the block diagram of FIG. 23, the signals from the detectors 121 are encoded by A/D encoder 140 to digital numbers that are fed to the operation control module microprocessor unit 122, via the input integrated circuit chip 123 and the system bus 141, along with information from the keyboard 124 controlled by the driver and/or passenger. A read only memory (ROM) chip 125 stores the characteristics of the vehicle, a random access memory (RAM) chip 126 stores the characteristics of the driver and passenger, a system clock 127 and an output chip 128 are provided, the output chip feeding control data to the motor drive unit which is essentially a digital to analog (D/A) converter that controls energization of the visor lateral drive motors 93 to 95 and the visor longitudinal extension motors such as 113 and 117 in each of the visors.

This operation control module is described herein only by the block diagram FIG. 23 and is programmed to operate functionally as described more fully in the functional diagram of FIG. 24. With these descriptions and others of embodiments of the invention herein contained, those who are skilled in the art are able to construct and operate the automatic sun visor system in all respects as described herein.

Operation of the Automatic Visor System

Turning next to FIG. 24, there is outlined the functional sequence of operation including driver's and/or passenger's actions where the driver and/or passenger participate in the operation to automatically position the driver's visor and the passenger's visor to block the sun from their eyes.

As shown in FIG. 24, operation starts at function 131, ignition ON, and:

1. if an override function at the keyboard has not been initiated at 132, and
2. if there is no signal change at 133, because the ignition key has not been turned OFF at 134, and
3. There is no new command from the keyboard, then the signal encoders 140 feed digital numbers representing the azimuth ($\psi$) and elevation ($\theta$) of the sun as detected by the detectors 121, to the MPU chip 122, via the input chip 123 and bus 141. Meanwhile, the vehicle characteristics stored in ROM 125 are fed to MPU 122 and the driver and/or passenger characteristics stored in RAM 126, as called for from keyboard 124, are also fed to MPU 122.

MPU 122 outputs consists of digital number instructions to all of the lateral visor drive motors 93 to 96 for both visors and all of the longitudinal visoe retracting motors like 113 and 114 in the driver's visor. Some of the functions of the output chip 128 are to feed the visor motor control signals through to motor drive unit 129, or to send on predetermined set of visor motor control signals that cause the visor to be driven to an out of the way position (visor store signals), if such is called for. That decision is made at 134, where NO signifies that the motor control signals from the MPU are not to position the visors, but rather the visors are to be stored. On the other hand, if the decision is YES, then the visor drive numbers to block the sun are sent on down to the ignition key OFF decision 134.

If the ignition key OFF decision at 134 is YES, then the visor store signals are sent down to motor drive unit 129 to store the visors. If, on the other hand, the decision at 134 is NO, then the visor drive signals from the MPU are fed to 129 and the visors are driven to block the sun.

Thereafter, so long as there is no override at 132 and there is no ignition key OFF at 134, the visors are controlled by the drive signals from the MPU that block the sun from the driver and passenger eyes.

During this operation, if the driver or passenger should decide to shift his position, either by moving his seat or simply shifting in his seat, he may insert new instructions in RAM 126 using keyboard 124. This is done without interrupting operation and immediately results in modification of the visor driver signals to accommodate the new instructions. Clearly, new instructions from the driver or passenger may also be initiated automatically by any changes in the driver's or the passenger's seat such as raising or lowering it or moving it foreward or backwards.

The exact format of instructions inserted via the keyboard by the driver/passenger is not presented herein, nor are all of the instructions that would be inserted to carry out the described operation presented herein. It is suggested that those skilled in the art can readily devise the formats, instructions and programs to carry out those operations.

The particular embodiment of the present invention described herein in detail is the best known use at the present time. However, it should be clearly understood that the same is made herein by way of illustration and example and is not to be taken by way of limitation. The spirit and scope of the present invention are to be limited only by the terms of the appended claims.

What is claimed is:

1. In a motor vehicle having a windshield and a driver's station for viewing outside the vehicle through the windshield, an automatic electrically energized sun blocking system comprising,
    (a) means for detecting the direction of the sun and producing signals representative of said direction, (b) one or more sunlight blocking visors located immediately at or adjacent said windshield,
(c) means for movably supporting said visor
(d) means for changing the position of said sun light blocking visor and
(e) means in electrical circuit with said detecting means and said means for changing position of said sun light blocking visor for changing the position of said sunlight blocking visor to block sunlight from the eyes said driver.

2. A system as in claim 1 wherein said means for detecting the direction of the sun detects the azimuth direction of the sun.

3. A system as in claim 1 wherein said means for detecting the direction of the sun detects the elevation direction of the sun.

4. A system as in claim 1 wherein said means for detecting the direction of the sun detects both the azimuth and the elevation directions of the sun.

5. A system as in claim 1 wherein said means for detecting the direction of the sun detects the direction of the sun in two perpendicular planes.

6. A system as in claim 5 wherein one of said two perpendicular planes is the longitudinal plane of substantial symmetry of said motor vehicle.

7. A system as in claim 5 wherein one of said two perpendicular planes is essentially parallel to the general plane of the floor of the vehicle.

8. A system as in claim 1 wherein said means for detecting the direction of the sun detects the sun within a predetermined solid angle subtended from said detector in a plane lying in a predetemined elevation angle subtended from said detector.

9. A system as in claim 8 wherein said means for detecting the direction of the sun detects the sun within a predetermined solid angle subtended from said detector in a plane in a predetermined azimuth direction subtended from said detector.

10. A system as in claim 1 wherein said means for detecting the direction of the sun detects the sun within a predetermined solid angle subtended from said detector in two perpendicular planes, one of which is at a predetermined azimuth direction and the other of which is at a predetermined elevation angle.

11. A system as in claim 1 wherein said means for detecting the direction of the sun detects the sun includes means defining a light path having an output end and an input aperture and a photo detector at said output, so arranged that sunlight that enters saod aperture within a predetermined solid angle subtended from said detector falls upon said detector, whereas sunlight outside of said predetermined solid angle that enters said aperture does not fall on said detector.

12. A system as in claim 11 wherein said means for detecting the direction of the sun detects the sun within a predetermined solid angle subtended from said detector in a plane lying in a predetermined elevation angle subtended from said detector.

13. A system as in claim 12 wherein said means for detecting the direction of the sun detects the sun within a predetermined solid angle subtended from said detector in a plane in a predetermined azimuth direction subtended from said detector.

14. A system as in claim 12 wherein said means for detecting the direction of the sun detects the sun within a predetermined solid angle subtended from said detector in two perpendicular planes, one of which is at a predetermined azimuth direction and the other of which is at a predetermined elevation angle.

15. A system as in claim 1 wherein,
said means moveably supporting said visor, is such that said visor is moveable to two or more different positions adjacent said windshield.

16. A system as in claim 15 wherein said different positions are lateral positions across a part of said windshield.

17. A system as in claim 15 wherein said different positions are longitudinal positions along a part of said windshield.

18. A system as in claim 16 wherein,
(a) said means moveably supporting said visor is a track above said windshield extending laterally cross a substantial part of said windshield,
(b) said visor is supported moveably by said track and
(c) one or more visor lateral drive devices in electrical circuit with said detecting means are provided for changing the lateral position of said visor along said part of said windshield.

19. A system as in claim 17 wherein one or more visor longitudinal drive devices in electrical circuit with said detecting means are provided for changing the longitudinal position of said visor along said part of said windshield.

20. A system as in claim 1 wherein,
(a) said sunlight blocking device and said means for changing the position of said sunlight blocking device include a visor and means moveably supporting said visor,
(b) whereby said visor is moveable to two or more different positions adjacent said windshield,
(c) some of said different positions are lateral positions across a lateral part of said windshield and
(d) some of said different positions are longitudinal positions along a longitudinal part of said windshield.

* * * * *